(12) United States Patent
Archer et al.

(10) Patent No.: US 7,827,024 B2
(45) Date of Patent: Nov. 2, 2010

(54) LOW LATENCY, HIGH BANDWIDTH DATA COMMUNICATIONS BETWEEN COMPUTE NODES IN A PARALLEL COMPUTER

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 11/746,333

(22) Filed: May 9, 2007

(65) Prior Publication Data

US 2008/0281997 A1  Nov. 13, 2008

(51) Int. Cl.
  *G06F 9/445* (2006.01)
  *G06F 13/00* (2006.01)
  *H04L 12/56* (2006.01)

(52) U.S. Cl. ............... 703/24; 703/2; 703/22; 712/1; 709/239; 370/390; 370/402

(58) Field of Classification Search ............... 703/2, 703/14, 24, 22; 370/402, 390; 709/209, 709/239; 712/1
  See application file for complete search history.

(56) References Cited

U.S. PATENT DOCUMENTS

| | | |
|---|---|---|
| 5,050,162 A | 9/1991 | Golestani |
| 5,617,537 A | 4/1997 | Yamada et al. |
| 5,680,116 A | 10/1997 | Hashimoto et al. |
| 5,790,530 A | 8/1998 | Moh et al. |
| 6,072,781 A | 6/2000 | Feeney et al. |
| 6,105,122 A | 8/2000 | Muller et al. |
| 7,155,541 B2 | 12/2006 | Ganapathy et al. |
| 2003/0233497 A1 | 12/2003 | Shih |
| 2005/0114561 A1 | 5/2005 | Lu et al. |
| 2005/0198113 A1 | 9/2005 | Mohamed et al. |

(Continued)

OTHER PUBLICATIONS

Office Action Dated Sep. 18, 2009 in U.S. Appl. No. 11/829,334.

(Continued)

*Primary Examiner*—Thai Phan
(74) *Attorney, Agent, or Firm*—Biggers & Ohanian, LLP

(57) ABSTRACT

Methods, parallel computers, and computer program products are disclosed for low latency, high bandwidth data communications between compute nodes in a parallel computer. Embodiments include receiving, by an origin direct memory access ('DMA') engine of an origin compute node, data for transfer to a target compute node; sending, by the origin DMA engine of the origin compute node to a target DMA engine on the target compute node, a request to send ('RTS') message; transferring, by the origin DMA engine, a predetermined portion of the data to the target compute node using memory FIFO operation; determining, by the origin DMA engine whether an acknowledgement of the RTS message has been received from the target DMA engine; if the an acknowledgement of the RTS message has not been received, transferring, by the origin DMA engine, another predetermined portion of the data to the target compute node using a memory FIFO operation; and if the acknowledgement of the RTS message has been received by the origin DMA engine, transferring, by the origin DMA engine, any remaining portion of the data to the target compute node using a direct put operation.

20 Claims, 8 Drawing Sheets

U.S. PATENT DOCUMENTS

| | | |
|---|---|---|
| 2006/0045005 A1* | 3/2006 | Blackmore et al. .......... 370/216 |
| 2006/0045109 A1* | 3/2006 | Blackmore et al. .......... 370/402 |
| 2006/0047771 A1* | 3/2006 | Blackmore et al. .......... 709/209 |
| 2006/0056405 A1* | 3/2006 | Chang et al. ................ 370/389 |
| 2006/0075057 A1 | 4/2006 | Gildea et al. |
| 2006/0206635 A1 | 9/2006 | Alexander et al. |
| 2006/0253619 A1 | 11/2006 | Torudbakken et al. |
| 2008/0109573 A1 | 5/2008 | Leonard et al. |
| 2008/0222317 A1 | 9/2008 | Go et al. |

OTHER PUBLICATIONS

Office Action Dated Sep. 15, 2009 in U.S. Appl. No. 11/829,339.
Office Action Dated Nov. 24, 2009 in U.S. Appl. No. 11/829,325.
Watson, Robert, "DMA Controller Programming in C," C Users Journal, v11n11, Nov. 1993, p. 35-50.
Office Action Dated May 26, 2009 in U.S. Appl. No. 11/829,325.
U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Office Action Dated Aug. 27, 2009 in U.S. Appl. No. 11/739,948.
Office Action Dated Sep. 1, 2009 in U.S. Appl. No. 11/776,718.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.

* cited by examiner

LOW LATENCY, HIGH BANDWIDTH DATA COMMUNICATIONS BETWEEN COMPUTE NODES IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, parallel computers, and products for low latency, high bandwidth data communications between compute nodes in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

In large processing systems using conventional direct memory access ('DMA') protocols, each target DMA engine typically receives data packets at the target nodes in a DMA memory first-in-first-out ('FIFO') buffer. Each packet in the memory FIFO buffer must be processed by the target processing core which consumes computational resources. When high bandwidth is important, such conventional protocols may be insufficient.

SUMMARY OF THE INVENTION

Methods, parallel computers, and computer program products are disclosed for low latency, high bandwidth data communications between compute nodes in a parallel computer. Embodiments include receiving, by an origin direct memory access ('DMA') engine of an origin compute node, data for transfer to a target compute node; sending, by the origin DMA engine of the origin compute node to a target DMA engine on the target compute node, a request to send ('RTS') message; transferring, by the origin DMA engine, a predetermined portion of the data to the target compute node using memory FIFO operation; determining, by the origin DMA engine whether an acknowledgement of the RTS message has been received from the target DMA engine; if the an acknowledgement of the RTS message has not been received, transferring, by the origin DMA engine, another predetermined portion of the data to the target compute node using a memory FIFO operation; and if the acknowledgement of the RTS message has been received by the origin DMA engine, transferring, by the origin DMA engine, any remaining portion of the data to the target compute node using a direct put operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
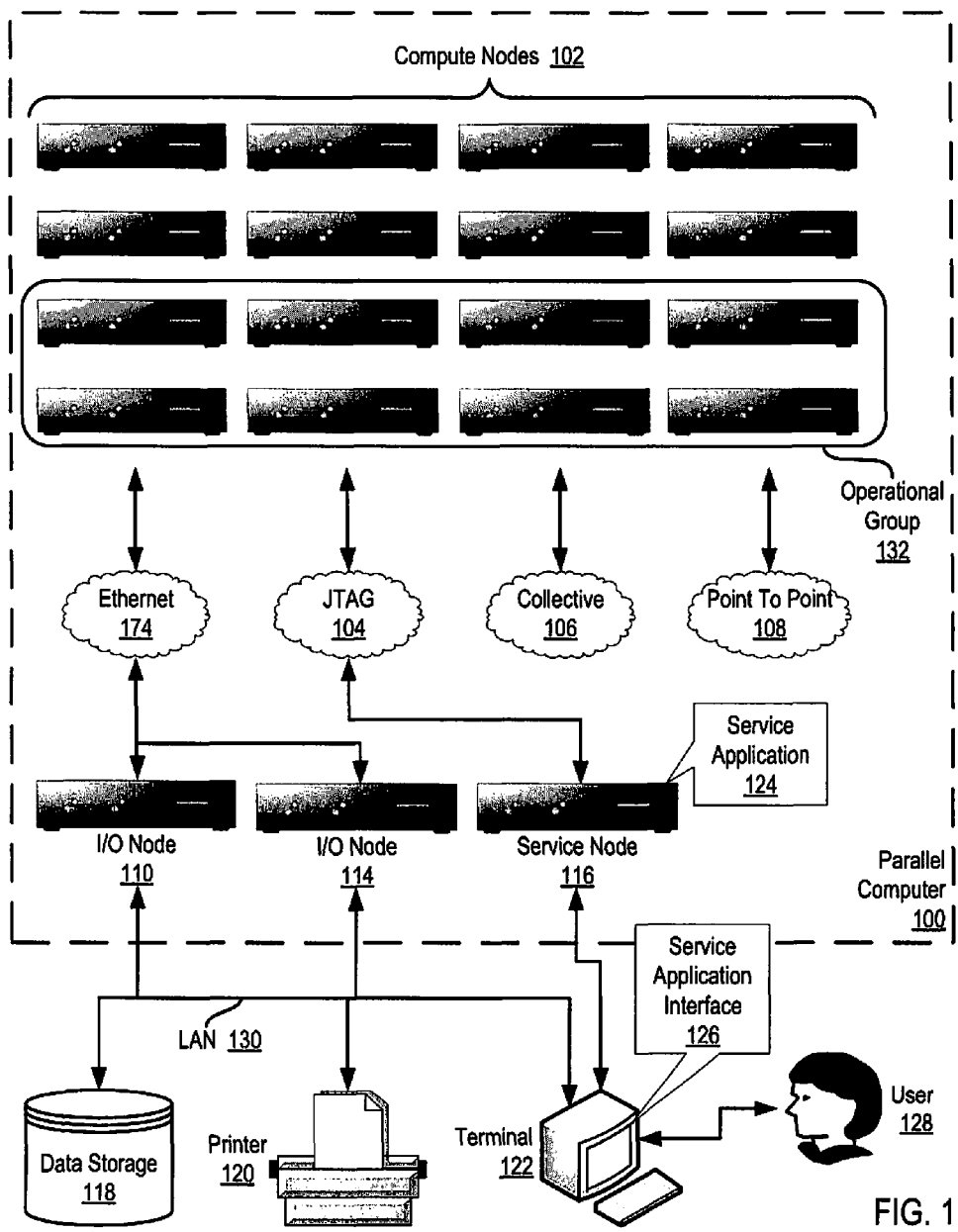
FIG. 1 illustrates an exemplary system for low latency, high bandwidth data communications between compute nodes in a parallel computer according to embodiments of the present invention.

Exemplary methods, computers, and computer program products for low latency, high bandwidth data communications between compute nodes in a parallel computer according to embodiments of the present invention are described with reference to the accompanying drawings, beginning with FIG. 1. FIG. 1 illustrates an exemplary system for low latency, high bandwidth data communications between compute nodes in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard.

MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally to for low latency, high bandwidth data communications between compute nodes in a parallel computer by receiving, by an origin direct memory access ('DMA') engine of an origin compute node, data for transfer to a target compute node; sending, by the origin DMA engine of the origin compute node to a target DMA engine on the target compute node, a request to send ('RTS') message; transferring, by the origin DMA engine, a predetermined portion of the data to the target compute node using memory FIFO operation; determining, by the origin DMA engine whether an acknowledgement of the RTS message has been received from the target DMA engine; if the an acknowledgement of the RTS message has not been received, transferring, by the origin DMA engine, another predetermined portion of the data to the target compute node using a memory FIFO operation; and if the acknowledgement of the RTS message has been received by the origin DMA engine, transferring, by the origin DMA engine, any remaining portion of the data to the target compute node using a direct put operation.

The arrangement of nodes, networks, and I/O devices making up the exemplary system illustrated in FIG. 1 are for explanation only, not for limitation of the present invention. Data processing systems capable of low latency, high bandwidth data communications between compute nodes in a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of low latency, high bandwidth data communications between compute nodes according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art.

Various embodiments of the present invention may be implemented on a variety of hardware platforms in addition to those illustrated in FIG. 1.

Low latency, high bandwidth data communications between compute nodes in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of low latency, high bandwidth data communications between compute nodes in a parallel computer according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored RAM (156) is an application messaging module (160), a library of computer program instructions that carry out parallel communications among compute nodes, including point to point operations as well as collective operations. Application program (158) effects data communications with other application running on other compute nodes by calling software routines in the application messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is a system messaging module (161) that implements system specific protocols for communications that support messaging for application (158) and the application messaging module (160). Such system specific protocols are typically invoked through a set of APIs that are exposed to the application messaging module (160). Such system specific protocols used for communications in the system messaging module (161) are typically isolated from the application (158) through the application messaging module (160), thus making the interface provided to the application (158) somewhat independent of system specific details implemented in the system messaging module (161). The system messaging module (161) of FIG. 2 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging module (161) typically accesses communications hardware and software useful according to the present invention such as, for example, DMA controller (195), DMA engine (197), and data communications adapters (180, 188).

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the exemplary compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
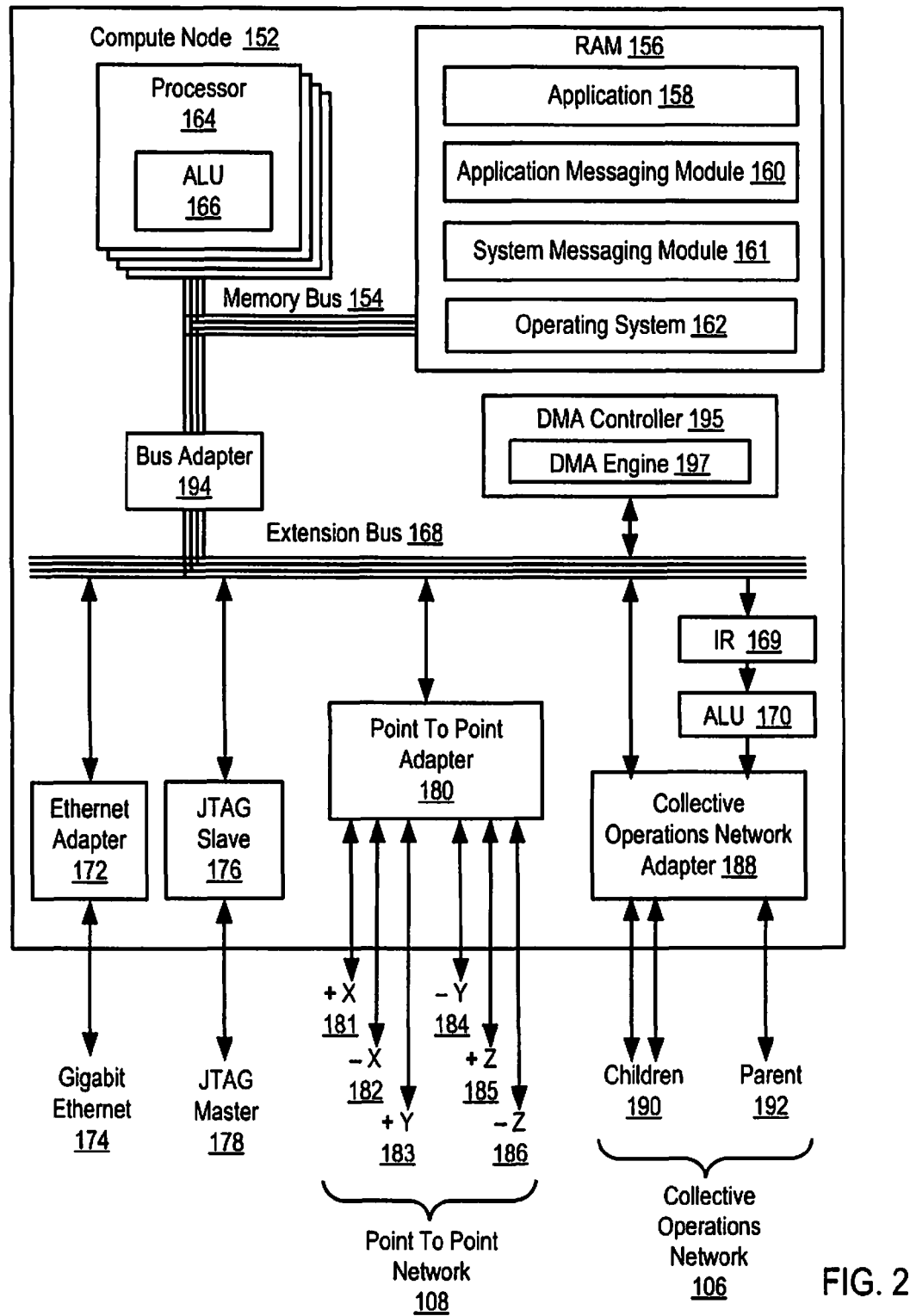
FIG. 2 sets forth a block diagram of an exemplary compute node useful in a parallel computer capable of low latency, high bandwidth data communications between compute nodes in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for low latency, high bandwidth data communications between compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in low latency, high bandwidth data communications between compute nodes in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a collective operations network adapter (188) that couples example compute node (152) for data communications to a network (106) that is optimal for collective message passing operations on a collective operations network configured, for example, as a binary tree. The collective operations network adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations network adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations network adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the system messaging module (161), and thereby the application message module (160), for controlling data transfers from an origin compute node to a target compute node according to embodiments of the present invention.

Figure 3A:
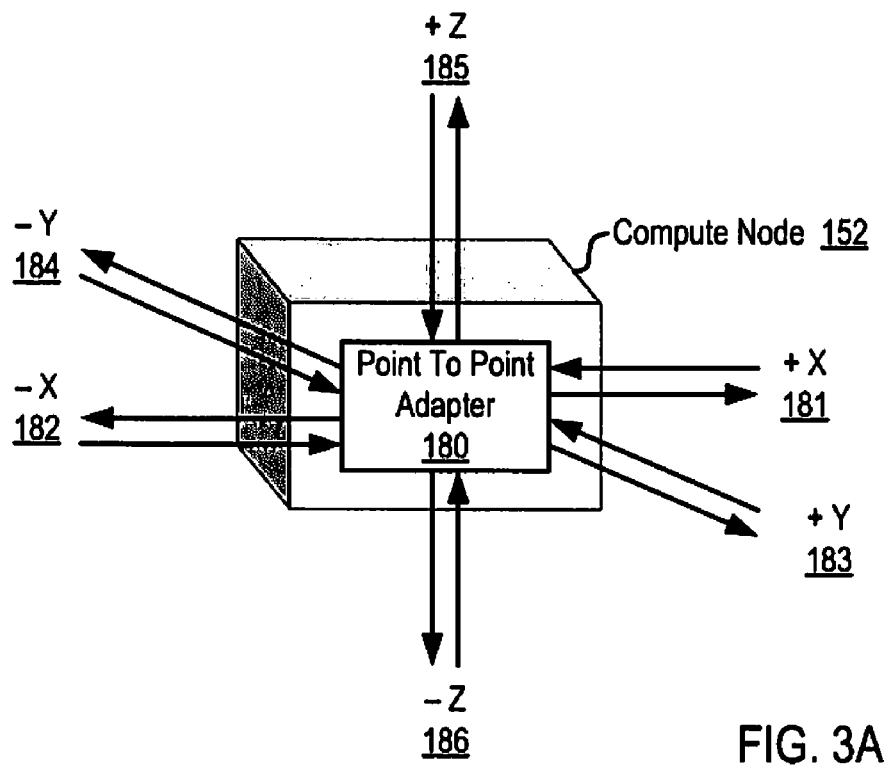
FIG. 3A illustrates an exemplary Point To Point Adapter useful in systems for low latency, high bandwidth data communications between compute nodes in a parallel computer according to embodiments of the present invention.

For further explanation, FIG. 3A illustrates an exemplary Point To Point Adapter (180) useful in systems for low latency, high bandwidth data communications between compute nodes in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
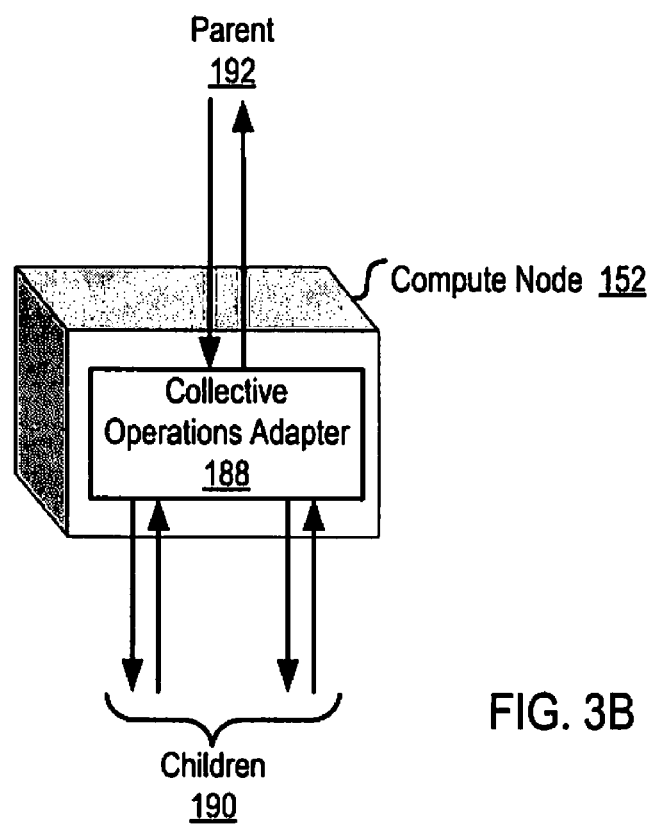
FIG. 3B illustrates an exemplary Collective Operations Adapter useful in systems for low latency, high bandwidth data communications between compute nodes in a parallel computer according to embodiments of the present invention.

For further explanation, FIG. 3B illustrates an exemplary Collective Operations Adapter (188) useful in systems for low latency, high bandwidth data communications between compute nodes in a parallel computer according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
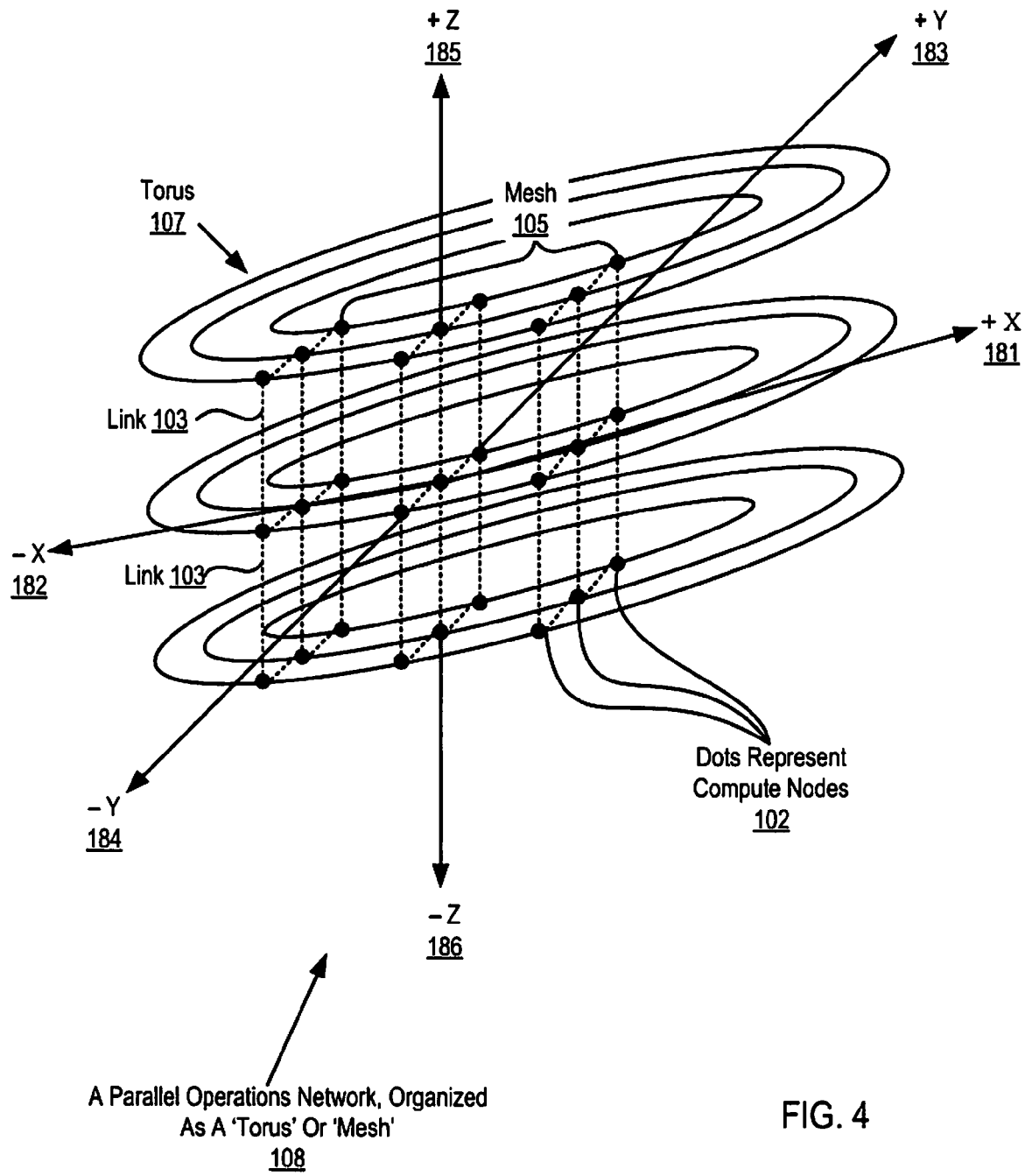
FIG. 4 illustrates an exemplary data communications network optimized for point to point operations.

For further explanation, FIG. 4 illustrates an exemplary data communications network optimized for point to point operations (108). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in low latency, high bandwidth data communications between compute nodes in a parallel computer in accordance with embodiments of the present invention may contain only a few compute nodes or may contain thousands of compute nodes.

Figure 5:
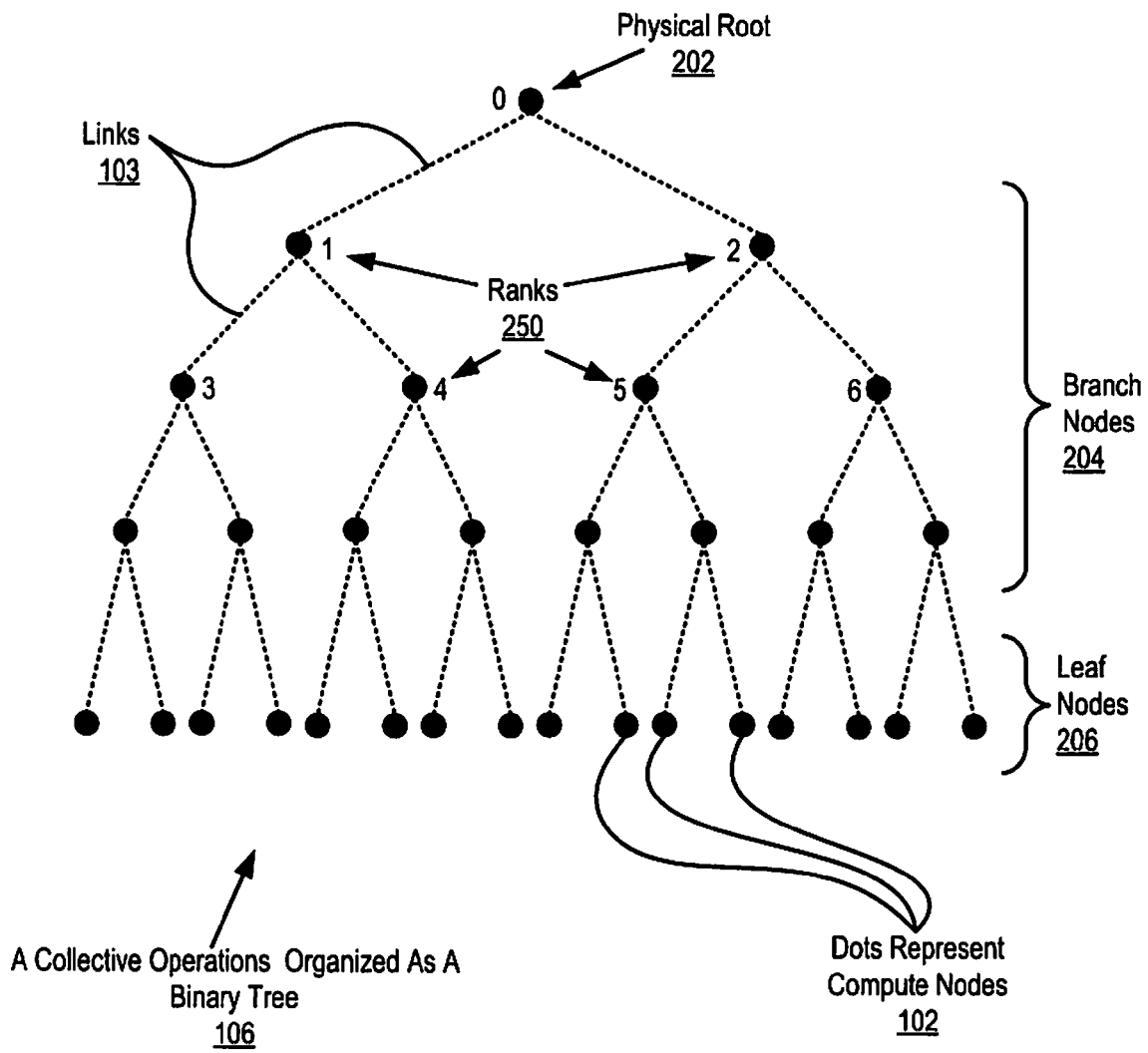
FIG. 5 illustrates an exemplary data communications network optimized for collective operations by organizing compute nodes in a tree.

For further explanation, FIG. 5 illustrates an exemplary data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for low latency, high bandwidth data communications between compute nodes in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
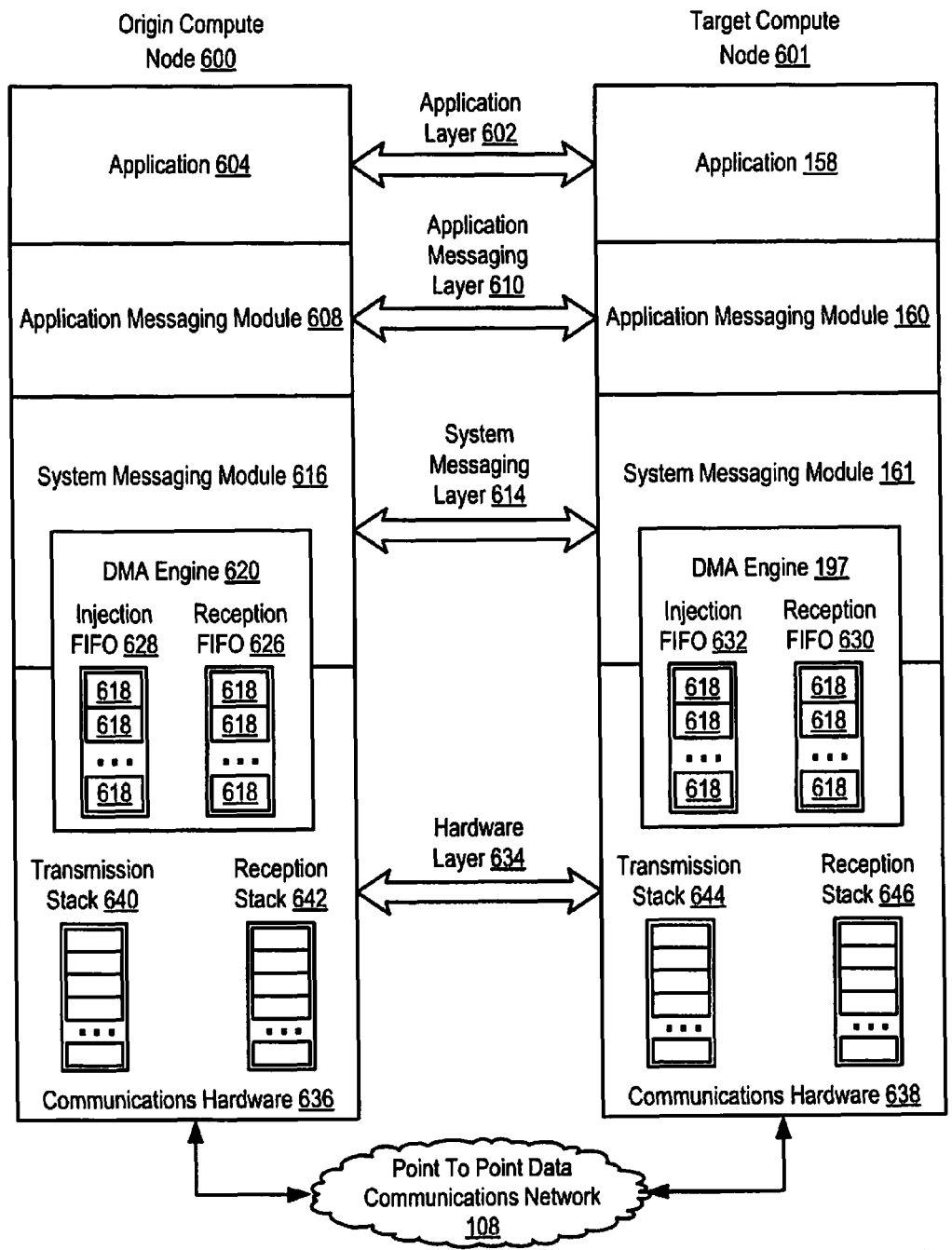
FIG. 6 sets forth a block diagram illustrating an exemplary communications architecture illustrated as a protocol stack useful in low latency, high bandwidth data communications between compute nodes in a parallel computer according to embodiments of the present invention.

For further explanation, FIG. 6 sets forth a block diagram illustrating an exemplary communications architecture illustrated as a protocol stack useful in low latency, high bandwidth data communications between compute nodes in a parallel computer according to embodiments of the present invention. The exemplary communications architecture of FIG. 6 sets forth two compute nodes, an origin compute node (600) and a target compute node (601). Only two compute nodes are illustrated in the example of FIG. 6 for ease of explanation and not for limitation. In fact, low latency, high bandwidth data communications between compute nodes in a parallel computer according to embodiments of the present invention may be implemented using many compute nodes in very large scale computer systems such as parallel computers with thousands of nodes.

The exemplary communications architecture of FIG. 6 includes an application layer (602) composed of an application (604) installed on the origin compute node (600) and an application (158) installed on the target compute node (601). Data communications between applications (604, 158) are effected using application messaging modules (608, 160) installed on each of the compute nodes (600, 601). Applications (604, 158) may communicate messages by invoking function of an application programming interfaces ('API') exposed by the application messaging modules (608 and 160). For the origin compute node's application (604) to transmit messages to the target compute node's application (158), the origin compute node's application (604) typically calls a 'send' messaging function of the application messaging module (608), while the target compute node's application (158) typically calls a 'receive' messaging function of the application messaging module (160). Each application (604 and 158) provides match data to their respective application messaging module (608 and 160), the origin compute node's application (604) providing origin match data and the target compute node's application (158) providing target match data.

Match data is the data used by the application messaging layer (610) to match the 'send' function called by the origin compute node's application (604) with the 'receive' function called by the target compute node's application (158) so that the data specified in the 'send' function is stored in the location specified in the 'receive' function. Match data may be implemented, for example, as a data structure specifying the origin compute node's unique rank in the operational group, a tag number provided by the application, and a context that identifies the particular operational group of compute nodes involved in the transfer. Match data provided to the origin compute node's application messaging module (608) is referred to as origin match data, while the match data provided to the target compute node's application messaging module (160) is referred to as target match data.

The exemplary communications architecture of FIG. 6 includes an application messaging layer (610) that provides a hardware-independent messaging interface that supports messaging in the application layer (602). Such a messaging interface is typically utilized by applications (604 and 158) in the application layer (602) through a set of APIs exposed by application messaging modules. In the example of FIG. 6, the messaging layer (610) is composed of an application messaging module (608) installed on the origin compute node (600) and an application messaging module (160) installed on the target compute node (601).

The exemplary communications architecture of FIG. 6 includes a system messaging layer (614) that implements hardware-specific protocols for communications that support messaging in the application layer (602) and the application messaging layer (610). Such system specific protocols are typically invoked through a set of APIs that are exposed to the application messaging layer (610). Such system specific protocols used for communications in the system messaging layer (614) are typically isolated from the application layer (602) through the application messaging layer (610), thus making the interface provided to the application layer (602) somewhat independent of system-specific details implemented in the system messaging layer (614). In the example of FIG. 6, the system messaging layer (614) is composed of a system messaging module (616) installed on the origin compute node (600) and a system messaging module (161) installed on the target compute node (601).

The system messaging layer (614) of FIG. 6 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging layer (614) typically accesses communications hardware and software useful according to the present invention such as, for example, DMA controllers, DMA engines, data communications hardware, and so on.

The exemplary communications architecture of FIG. 6 also includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 601) on the physical network medium. The hardware layer (634) of FIG. 6 is composed of communications hardware (636) of the origin compute node (600), communications hardware (638) of the target compute node (601), and the data communications network (108) connecting the origin compute node (600) to the target compute node (601). Such communications hardware may include, for example, point-to-point adapters and DMA controllers as described above with reference to FIGS. 2 and 3A. In the example of FIG. 6, the communications hardware (636 and 638) each include a transmission stack (640 and 644) for storing network packets for transmission to other communications hardware through the data communications network (108), and each include a reception stack (642 and 646) for storing network packets received from other communications hardware through the data communications network (108).

The exemplary communications architecture of FIG. 6 illustrates a DMA engine (620) for the origin compute node (600) and a DMA engine (197) for the target compute node (601). The DMA engines (620 and 197) in the example of FIG. 6 are illustrated in both the system messaging layer (614) and the hardware layer (634). The DMA engines (620 and 197) are shown in both the system messaging layer (614) and the hardware layer (634) because a DMA engine useful in embodiments of the present invention may often provide system messaging layer interfaces and also implement communications according to some aspects of the communication hardware layer (634). The exemplary DMA engines (620 and 197) of FIG. 6 each include an injection FIFO buffer (628 and 632) for storing data descriptors (618) for messages to be sent to other DMA engines on other compute nodes using a memory FIFO data transfer operation or direct put data transfer operation. The exemplary DMA engines (620 and 197) of FIG. 6 each also include a reception FIFO buffer (626 and 630) for storing data descriptors (618) for messages received from other DMA engines on other compute nodes. Although FIG. 6 only illustrates a single injection FIFO buffer and a single reception FIFO buffer, readers will note that a DMA engine may have access to any number of injection FIFO buffers and reception FIFO buffers for carrying out data transfers from an origin compute node to a target compute node according to embodiments of the present invention.

A memory FIFO data transfer operation is a mode of transferring data using a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

The exemplary DMA engines (620 and 197) of FIG. 6 are capable of participating in low latency, high bandwidth data communications between compute nodes in a parallel computer according to embodiments of the present invention by receiving, by an origin direct memory access ('DMA') engine of an origin compute node, data for transfer to a target compute node; sending, by the origin DMA engine of the origin compute node to a target DMA engine on the target compute node, a request to send ('RTS') message; transferring, by the origin DMA engine, a predetermined portion of the data to the target compute node using memory FIFO operation; determining, by the origin DMA engine whether an acknowledgement of the RTS message has been received from the target DMA engine; if the an acknowledgement of the RTS message has not been received, transferring, by the origin DMA engine, another predetermined portion of the data to the target compute node using a memory FIFO operation; and if the acknowledgement of the RTS message has been received by the origin DMA engine, transferring, by the origin DMA engine, any remaining portion of the data to the target compute node using a direct put operation.

Figure 7:
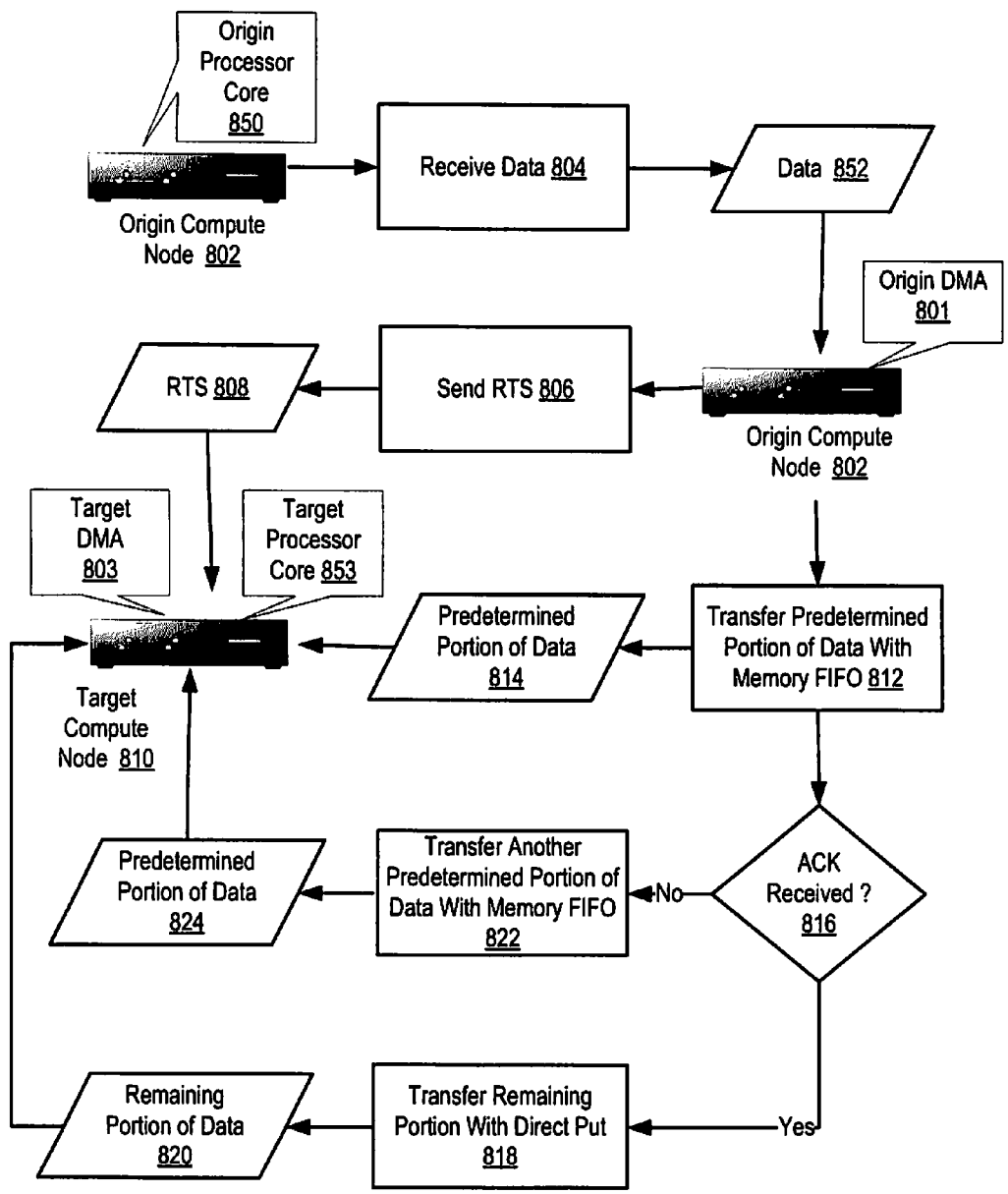
FIG. 7 sets forth a flow chart illustrating an exemplary method for low latency, high bandwidth data communications between compute nodes in a parallel computer according to the present invention.

For further explanation, FIG. 7 sets forth a flow chart illustrating an exemplary method for low latency, high bandwidth data communications between compute nodes in a parallel computer. The method of FIG. 7 includes receiving (804), by an origin direct memory access ('DMA') engine (801) of an origin compute node (802), data (852) for transfer to a target compute node (810). Receiving (804) data (852) for transfer to a target compute node (810) may be carried out in response to an instruction from an origin processor core (850) to initiate a transfer of data to the target compute node (810) according to the low latency, high bandwidth method of FIG. 7.

The method of FIG. 7 also includes sending (806), by the origin DMA engine (801) of the origin compute node (802) to a target DMA engine (803) on the target compute node (810), a request to send ('RTS') message (808). The request to send message typically identifies the data (852) to be sent from the origin DMA engine (801) to the target DMA engine (803) and also typically specifies a data storage reference and a data length. The data storage reference may be implemented as an address space and an offset from that address space identifying the beginning storage location of the data to be sent. The data length provides the size of the data to be transferred to and stored by the target DMA engine (803). A target DMA engine (803) receiving such a request to send may then use the data storage reference and data length to identify data storage on the target node for storing the data upon receipt from the origin DMA engine.

In the method of FIG. 7, the origin DMA engine (801) does not wait for an acknowledgment to be received from the target DMA engine (803) in response to the RTS message (808). Instead of waiting for an acknowledgement, the method of FIG. 7 continues by transferring (812), by the origin DMA engine (801), a predetermined portion (814) of the data (852) to the target compute (810) node using memory FIFO operation. The predetermined portion (814) of the data (852) is typically a size determined to be small enough to be transferred quickly by a memory FIFO data transfer and yet large enough to keep overhead resources busy until the origin DMA receives an acknowledgement and proceeds with the more efficient direct put operation. The size of the predetermined portion will vary in different implementations of the method of FIG. 7 in dependence upon a number of factors as will occur to those of skill in the art. Such factors include the specific hardware of the parallel computer, the specific applications running on the hardware, current network traffic on the parallel computer, typical network traffic on the parallel computer, the total size of the data to be transferred according to the method of FIG. 7, and others as will occur to those of skill in the art.

As mentioned above, a memory FIFO data transfer operation is a mode of transferring data using a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

Because the predetermined portions of the data to be transferred are often relatively small with regard to the total size of the data (852), transferring (812), by the origin DMA engine (801), a predetermined portion (814) of the data (852) to the target compute (810) node using memory FIFO operation according to the method of FIG. 7 may be carried out by transferring the predetermined portion (814) in sequential packet order. Transferring the predetermined portion (814) in sequential packet order may be carried out using a static routing algorithm. Alternatively, in times of increased network traffic or where the predetermined portion of the data (852) is relatively large, transferring the predetermined portion (814) may be carried out by transferring the predetermined portion without regard to packet order. Transferring the predetermined portion without regard to packet order may be carried out using a dynamic routing algorithm.

Transferring (812), by the origin DMA engine (801), a predetermined portion (814) of the data (852) to the target compute (810) node using memory FIFO operation according to the method of FIG. 7 may also be carried out by sending, from the origin DMA engine (801), the predetermined portion (814) of the data (852) to the target compute node (810) using a memory FIFO operation, including decrementing by the origin DMA engine (801) a send counter by the size of the predetermined portion and receiving, by the target DMA engine (803), the predetermined portion (814) of the data (852) from the origin DMA engine (801) using memory FIFO operation, including decrementing by the target DMA engine (803) a target counter by the size of the predetermined portion. That is, upon initiating the data transfer an origin DMA engine (801) may initialize a send counter equal in size to the data (852) to be sent to the target node and upon transferring a predetermined portion (814) of the data, the origin DMA engine decrements the send counter by the size of the predetermined potion (814). Similarly, a target DMA engine (803) may initialize a receive counter equal in size to the data (852) to be transferred according to the method of FIG. 7 and upon receiving the predetermined portion (814), the target DMA engine may decrement the send counter by the size of the predetermined portion.

The method of FIG. 7 also includes determining (816), by the origin DMA engine (801) whether an acknowledgement of the RTS message (808) has been received from the target DMA engine (803) and if the an acknowledgement of the RTS message (808) has not been received, the method of FIG. 7 includes transferring (822), by the origin DMA engine (801), another predetermined portion (824) of the data (852) to the target compute node (810) using a memory FIFO operation. That is, in the method of FIG. 7, the origin DMA engine (801) again does not wait for an acknowledgment to be received from the target DMA engine (803). Again instead of waiting for an acknowledgement, the method of FIG. 7 continues by transferring (822), by the origin DMA engine (801), another predetermined portion (824) of the data (852) to the target compute node (810) using a memory FIFO operation. The method of FIG. 7 continues by transferring predetermined portions of the data to the target compute node using a memory FIFO operation until an acknowledgement is received from the target DMA engine.

If the acknowledgement of the RTS message (808) has been received by the origin DMA engine (801), the method of FIG. 7 includes transferring (818), by the origin DMA engine (801), any remaining portion (820) of the data (852) to the target compute node (810) using a direct put operation. As mentioned above, a direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA engine transfers the data to be stored on the target compute node along with a specific identification of a storage location on the target compute node. The origin DMA engine knows the specific storage location on the target compute node because the specific storage location for storing the data on the target compute node has been previously provided by the target DMA engine to the origin DMA such as by the acknowledgment received from the target DMA engine in the method of FIG. 7.

Because predetermined portions of the data (852) have already been transferred to the target compute node, transferring (818), by the origin DMA engine (801), any remaining portion (820) of the data (852) to the target compute node (810) using a direct put operation according to the method of FIG. 7 may also include calculating an offset in dependence upon number of predetermined portions transferred using the memory FIFO operation and the size of the predetermined portions of data and providing to the target DMA engine (803) a reference name and the offset for storing the remaining portion. Calculating an offset in dependence upon number of predetermined portions transferred using the memory FIFO operation may be carried out by summing the size of all the predetermined portions transferred using the memory FIFO operation. An offset so calculated is the total size of all the previously sent predetermined portions and provides a reference to the beginning of the data to be sent by the direct put operation.

To improve the speed of the direct put operation, transferring (818), by the origin DMA engine (801), any remaining portion (820) of the data (852) to the target compute node (810) using a direct put operation may also include transferring the remaining portion without regard to packet order. Transferring the remaining portion without regard to packet order may be carried out according to a dynamic routing algorithm. Transferring the remaining portion without regard to packet order may also be useful at times of increased network traffic on the parallel computer, Alternatively, and often at times of reduced network traffic on the parallel computer, transferring (818), by the origin DMA engine (801), any remaining portion (820) of the data (852) to the target compute node (810) using a direct put operation may also include transferring the remaining portion in sequential to packet order. Transferring the remaining portion in sequential order may be carried out according to a static routing algorithm.

Transferring (818), by the origin DMA engine (801), any remaining portion (820) of the data (852) to the target compute node (810) using a direct put operation according to the method of FIG. 7 may also include sending, from the origin DMA engine (801), the remaining portion (818) of the data (852) to the target compute node (810) using the direct put operation, including decrementing by the origin DMA engine (801) a send counter by size of the remaining portions and receiving, by the target DMA engine (803), the remaining portion (820) of the data (852) from the origin DMA engine using the direct put operation, including decrementing by the target DMA engine (803) a target counter by the size of the remaining portion (818). That is, upon transferring the remaining portion of the data, the origin DMA engine typically decrements the send counter by the size of the remaining portion thereby typically decrementing the send counter to zero. Similarly, upon receiving the remaining portion in the direct put operation, a target DMA engine typically decrements the send counter by the size of the remaining portion thereby also typically decrementing the receive counter to zero.

Transferring (818), by the origin DMA engine (801), any remaining portion (820) of the data (852) to the target compute node (810) using a direct put operation according to the method of FIG. 7 may also include determining whether the data transfer is complete in dependence upon the target counter, and if the data transfer is complete, notifying a target processor core (853) on the target compute node (810) by the target DMA engine (803). Notifying a target processor core (853) on the target compute node (810) by the target DMA engine (803) may be carried out by invoking a callback function.

Figure 8:
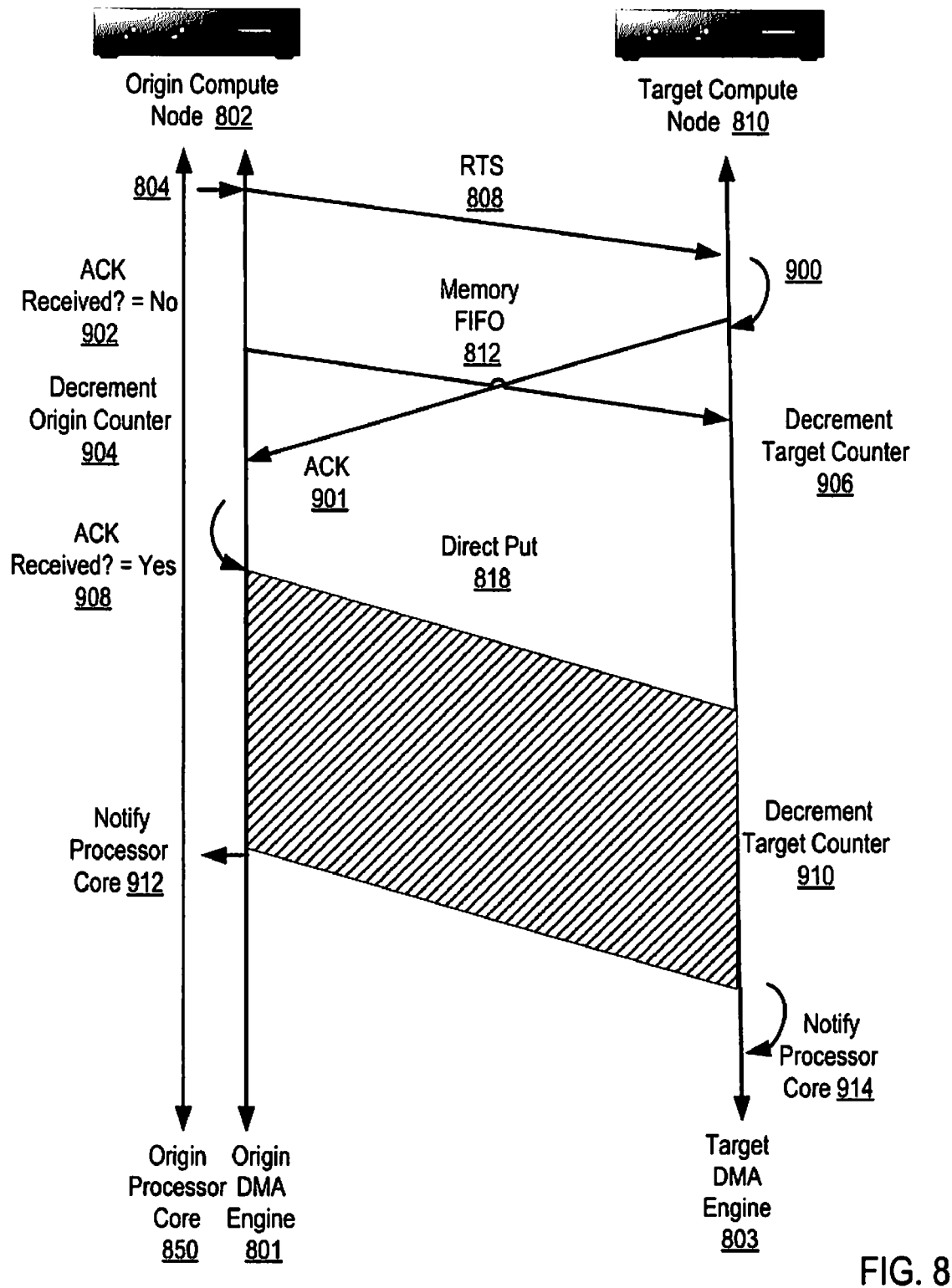
FIG. 8 sets forth a calling sequence diagram illustrating a method for low latency, high bandwidth data communications between compute nodes in a parallel computer according to the present invention.

For further explanation, FIG. 8 sets forth a calling sequence diagram illustrating a the method for low latency, high bandwidth data communications between compute nodes illustrated in the flow chart of FIG. 7. The method of FIG. 8 includes receiving (804), by an origin direct memory access ('DMA') engine (801) of an origin compute node (802), data for transfer to a target compute node (810) and sending, by the origin DMA engine (801) of the origin compute node (802) to a target DMA engine (803) on the target compute node (810), a request to send ('RTS') message (808).

In the method of FIG. 8, the target DMA engine (803) processes the request to send message (808). The target DMA engine (803) sends an acknowledgement message (901) back to the origin DMA engine (801) in response to the RTS message (808).

As mentioned above, waiting for the target DMA engine (803) to process the RTS message (808) and send the acknowledgement message would result in unnecessary delay in transmitting data to the target compute node (810). Instead of waiting for the acknowledgement (901), therefore, the method of FIG. 8 includes transferring (812), by the origin DMA engine (801), a predetermined portion of the data to the target compute (810) node using memory FIFO operation.

The method of FIG. 8 includes determining, by the origin DMA engine whether an acknowledgement of the RTS message has been received from the target DMA engine and if the an acknowledgement of the RTS message has not been received, transferring, by the origin DMA engine, another predetermined portion of the data to the target compute node using a memory FIFO operation. In the method of FIG. 8 the origin DMA engine (801) will repeatedly determine whether an acknowledgement has been received and transfer predetermined portions of the data to the target compute (810) node using memory FIFO operations until such an acknowledgement is received.

When the acknowledgement (901) has been received (908), the method of FIG. 8 includes transferring (818), by the origin DMA engine (801), any remaining portion of the data to the target compute node (810) using a direct put operation (818). In the example of FIG. 8, when the origin DMA engine (801) has sent all the remaining portion of the data to be transferred, the origin DMA engine (801) notifies (912) the origin processor core (850) of the origin compute node (802). In the example of FIG. 8, when the target DMA engine (803) has received all the remaining portion of the data to be transferred, the target DMA engine (803) notifies (914) a target processor core of the target compute node (810).

Exemplary embodiments of the present invention are described largely in the context of a fully functional computer system for low latency, high bandwidth data communications between compute nodes in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications.

Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for low latency, high bandwidth data communications between compute nodes in a parallel computer, the method comprising:
   receiving, by an origin direct memory access ('DMA') engine of an origin compute node, data for transfer to a target compute node;
   sending, by the origin DMA engine of the origin compute node to a target DMA engine on the target compute node, a request to send ('RTS') message;
   transferring, by the origin DMA engine, a predetermined portion of the data to the target compute node using memory FIFO operation;
   determining, by the origin DMA engine whether an acknowledgement of the RTS message has been received from the target DMA engine;
   if the an acknowledgement of the RTS message has not been received, transferring, by the origin DMA engine, another predetermined portion of the data to the target compute node using a memory FIFO operation; and
   if the acknowledgement of the RTS message has been received by the origin DMA engine, transferring, by the origin DMA engine, any remaining portion of the data to the target compute node using a direct put operation.

2. The method of claim 1 wherein transferring, by the origin DMA engine, a predetermined portion of the data to the target compute node using memory FIFO operation further comprises transferring the predetermined portion in sequential packet order.

3. The method of claim 1 wherein transferring, by the origin DMA engine, a predetermined portion of the data to the target compute node using memory FIFO operation further comprises:
   sending, from the origin DMA engine, the predetermined portion of the data to the target compute node using a memory FIFO operation, including decrementing by the origin DMA engine a send counter by the size of the predetermined portion; and
   receiving, by the target DMA engine, the predetermined portion of the data from the origin DMA engine using memory FIFO operation, including decrementing by the target DMA engine a target counter by the size of the predetermined portion.

4. The method of claim 3 wherein transferring, by the origin DMA engine, any remaining portion of the data to the target compute node using a direct put operation further comprises:

calculating an offset in dependence upon number of predetermined portions transferred using the memory FIFO operation and the size of the predetermined portions of data; and providing to the target DMA engine a reference name and the offset for storing the remaining portion.

5. The method of claim 1 wherein transferring, by the origin DMA engine, any remaining portion of the data to the target compute node using a direct put operation further comprises:

sending, from the origin DMA engine, the remaining portion of the data to the target compute node using the direct put operation, including decrementing by the origin DMA engine a send counter by size of the remaining portions;

receiving, by the target DMA engine, the remaining portion of the data from the origin DMA engine using the direct put operation, including decrementing by the target DMA engine a target counter by the size of the remaining portion;

determining whether the data transfer is complete in dependence upon the target counter; and if the data transfer is complete, notifying a target processor core on the target compute node by the target DMA engine.

6. The method of claim 1 wherein transferring, by the origin DMA engine, any remaining portion of the data to the target compute node using a direct put operation further comprises transferring the remaining portion without regard to packet order.

7. A parallel computer capable of low latency, high bandwidth data communications between compute nodes, the parallel computer comprising a plurality of compute nodes, each compute node comprising a direct memory access ('DMA') controller, a DMA engine installed upon the DMA controller, a computer processor, a computer memory operatively coupled to the computer processor, the computer memory having disposed within it computer program instructions capable of:

receiving, by an origin direct memory access ('DMA') engine of an origin compute node, data for transfer to a target compute node;

sending, by the origin DMA engine of the origin compute node to a target DMA engine on the target compute node, a request to send ('RTS') message;

transferring, by the origin DMA engine, a predetermined portion of the data to the target compute node using memory FIFO operation;

determining, by the origin DMA engine whether an acknowledgement of the RTS message has been received from the target DMA engine;

if the an acknowledgement of the RTS message has not been received, transferring, by the origin DMA engine, another predetermined portion of the data to the target compute node using a memory FIFO operation; and if the acknowledgement of the RTS message has been received by the origin DMA engine, transferring, by the origin DMA engine, any remaining portion of the data to the target compute node using a direct put operation.

8. The parallel computer of claim 7 wherein computer program instructions capable of transferring, by the origin DMA engine, a predetermined portion of the data to the target compute node using memory FIFO operation further comprise computer program instructions capable of transferring the predetermined portion in sequential packet order.

9. The parallel computer of claim 7 wherein computer program instructions capable of transferring, by the origin DMA engine, a predetermined portion of the data to the target compute node using memory FIFO operation further comprise computer program instructions capable of:

sending, from the origin DMA engine, the predetermined portion of the data to the target compute node using a memory FIFO operation, including decrementing by the origin DMA engine a send counter by the size of the predetermined portion; and receiving, by the target DMA engine, the predetermined portion of the data from the origin DMA engine using memory FIFO operation, including decrementing by the target DMA engine a target counter by the size of the predetermined portion.

10. The parallel computer of claim 9 wherein computer program instructions capable of transferring, by the origin DMA engine, any remaining portion of the data to the target compute node using a direct put operation further comprise computer program instructions capable of:

calculating an offset in dependence upon number of predetermined portions transferred using the memory FIFO operation and the size of the predetermined portions of data; and providing to the target DMA engine a reference name and the offset for storing the remaining portion.

11. The parallel computer of claim 7 wherein computer program instructions capable of transferring, by the origin DMA engine, any remaining portion of the data to the target compute node using a direct put operation further comprise computer program instructions capable of:

sending, from the origin DMA engine, the remaining portion of the data to the target compute node using the direct put operation, including decrementing by the origin DMA engine a send counter by size of the remaining portions;

receiving, by the target DMA engine, the remaining portion of the data from the origin DMA engine using the direct put operation, including decrementing by the target DMA engine a target counter by the size of the remaining portion;

determining whether the data transfer is complete in dependence upon the target counter; and if the data transfer is complete, notifying a target processor core on the target compute node by the target DMA engine.

12. The parallel computer of claim 7 wherein computer program instructions capable of transferring, by the origin DMA engine, any remaining portion of the data to the target compute node using a direct put operation further comprise computer program instructions capable of transferring the remaining portion without regard to packet order.

13. A computer program product for low latency, high bandwidth data communications between compute nodes of a parallel computer, the computer program product disposed upon a computer readable medium, the computer program product comprising computer program instructions capable of:

receiving, by an origin direct memory access ('DMA') engine of an origin compute node, data for transfer to a target compute node;

sending, by the origin DMA engine of the origin compute node to a target DMA engine on the target compute node, a request to send ('RTS') message;

transferring, by the origin DMA engine, a predetermined portion of the data to the target compute node using memory FIFO operation;

determining, by the origin DMA engine whether an acknowledgement of the RTS message has been received from the target DMA engine;

if the an acknowledgement of the RTS message has not been received, transferring, by the origin DMA engine, another predetermined portion of the data to the target compute node using a memory FIFO operation; and if the acknowledgement of the RTS message has been received by the origin DMA engine, transferring, by the origin DMA engine, any remaining portion of the data to the target compute node using a direct put operation.

14. The computer program product of claim 13 wherein computer program instructions capable of transferring, by the origin DMA engine, a predetermined portion of the data to the target compute node using memory FIFO operation further comprise computer program instructions capable of transferring the predetermined portion in sequential packet order.

15. The computer program product of claim 13 wherein computer program instructions capable of transferring, by the origin DMA engine, a predetermined portion of the data to the target compute node using memory FIFO operation further comprise computer program instructions capable of:

sending, from the origin DMA engine, the predetermined portion of the data to the target compute node using a memory FIFO operation, including decrementing by the origin DMA engine a send counter by the size of the predetermined portion; and receiving, by the target DMA engine, the predetermined portion of the data from the origin DMA engine using memory FIFO operation, including decrementing by the target DMA engine a target counter by the size of the predetermined portion.

16. The computer program product of claim 15 wherein computer program instructions capable of transferring, by the origin DMA engine, any remaining portion of the data to the target compute node using a direct put operation further comprise computer program instructions capable of:

calculating an offset in dependence upon number of predetermined portions transferred using the memory FIFO operation and the size of the predetermined portions of data; and providing to the target DMA engine a reference name and the offset for storing the remaining portion.

17. The computer program product of claim 13 wherein computer program instructions capable of transferring, by the origin DMA engine, any remaining portion of the data to the target compute node using a direct put operation further comprise computer program instructions capable of:

sending, from the origin DMA engine, the remaining portion of the data to the target compute node using the direct put operation, including decrementing by the origin DMA engine a send counter by size of the remaining portions;

receiving, by the target DMA engine, the remaining portion of the data from the origin DMA engine using the direct put operation, including decrementing by the target DMA engine a target counter by the size of the remaining portion;

determining whether the data transfer is complete in dependence upon the target counter; and if the data transfer is complete, notifying a target processor core on the target compute node by the target DMA engine.

18. The computer program product of claim 13 wherein computer program instructions capable of transferring, by the origin DMA engine, any remaining portion of the data to the target compute node using a direct put operation further comprise computer program instructions capable of transferring the remaining portion without regard to packet order.

19. The computer program product of claim 13 wherein the computer readable medium comprises a recordable medium.

20. The computer program product of claim 13 wherein the computer readable medium comprises a transmission medium.

* * * * *